(12) United States Patent
Pignal

(10) Patent No.: US 10,943,221 B2
(45) Date of Patent: Mar. 9, 2021

(54) MOBILE PAYMENT TERMINAL COMPRISING AN EMBEDDED UNLOCKING FUNCTION

(71) Applicant: INGENICO GROUP, Paris (FR)

(72) Inventor: Pierre Pignal, Valence (FR)

(73) Assignee: INGENICO GROUP, Paris (FR)

(*) Notice: Subject to any disclaimer, the term of this patent is extended or adjusted under 35 U.S.C. 154(b) by 457 days.

(21) Appl. No.: 15/519,395

(22) PCT Filed: Oct. 16, 2015

(86) PCT No.: PCT/EP2015/073986
§ 371 (c)(1),
(2) Date: Apr. 14, 2017

(87) PCT Pub. No.: WO2016/059201
PCT Pub. Date: Apr. 21, 2016

(65) Prior Publication Data
US 2017/0236109 A1 Aug. 17, 2017

(30) Foreign Application Priority Data
Oct. 17, 2014 (FR) ...................................... 1460027

(51) Int. Cl.
G06Q 20/20 (2012.01)
G07G 1/00 (2006.01)
G07F 7/08 (2006.01)
G06Q 20/32 (2012.01)
E05B 73/00 (2006.01)

(52) U.S. Cl.
CPC ......... *G06Q 20/206* (2013.01); *G06Q 20/322* (2013.01); *G07F 7/0886* (2013.01); *G07G 1/0018* (2013.01); *E05B 2073/0088* (2013.01)

(58) Field of Classification Search
CPC .. G06Q 20/206; G06Q 20/322; G07F 7/0886; G07G 1/0018
USPC ....................................... 705/18, 21; 235/7 R
See application file for complete search history.

(56) References Cited

U.S. PATENT DOCUMENTS

| 5,812,356 A * | 9/1998 | O'Connor | G06F 1/1632 335/179 |
| 2015/0032559 A1* | 1/2015 | Sonnendorfer | H04M 1/0254 705/21 |
| 2015/0228169 A1 | 8/2015 | Rom | |

FOREIGN PATENT DOCUMENTS

| WO | 2007010484 A2 | 1/2007 | |
| WO | WO-2007010484 A2 * | 1/2007 | ........... G06F 21/554 |
| WO | 2014029768 A1 | 2/2014 | |

OTHER PUBLICATIONS

International Search Report dated Dec. 16, 2015 for corresponding International Application No. PCT/EP2015/073986, filed Oct. 16, 2015.

(Continued)

*Primary Examiner* — Luna Champagne
(74) *Attorney, Agent, or Firm* — David D. Brush; Westman, Champlin & Koehler, P.A.

(57) ABSTRACT

A mobile electronic payment terminal includes a reversible fixed attachment to a support. The electronic payment terminal also includes a command module, which commands unlocking of the reversible fixed attachment enabling the mobile electronic payment terminal to be detached from the support.

9 Claims, 5 Drawing Sheets

(56) References Cited

OTHER PUBLICATIONS

Written Opinion of the International Searching Authority dated Dec. 16, 2015 for corresponding International Application No. PCT/EP2015/073986, filed Oct. 16, 2015.

English translation of the International Preliminary Report on Patentability dated Dec. 16, 2015 for corresponding International Application No. PCT/EP2015/073986, filed Oct. 16, 2015.

* cited by examiner

MOBILE PAYMENT TERMINAL COMPRISING AN EMBEDDED UNLOCKING FUNCTION

1. CROSS-REFERENCE TO RELATED APPLICATIONS

This Application is a Section 371 National Stage Application of International Application No. PCT/EP2015/073986, filed Oct. 16, 2015, the content of which is incorporated herein by reference in its entirety, and published as WO 2016/059201 on Apr. 21, 2016, not in English.

2. FIELD OF THE INVENTION

The field of the invention is that of mobile electronic terminals.

More specifically, the invention relates to mobile payment terminals to be used with nomadic digital supports.

The invention has many applications such as for example the use of these terminals with digital tablets or digital terminals and/or kiosks particular.

3. TECHNOLOGICAL BACKGROUND

We shall strive more particularly here below in this document to describe the problems and issues existing in the field of mobile payment terminals, that have been faced by the inventors of the present patent application. The invention is of course not limited to this particular field of application but is of interest for all mobile electronic terminals that have to cope with proximate or similar problems and issues.

In the prior art, there are known nomadic digital supports such as touch-screen tablets or digital terminals that interact with mobile payment terminals attached to them. This type of device is often found in exhibitions and trade fairs for example.

To carry out the payment operation, it is preferable to remove the payment terminal from its support (in this case a touch-screen tablet or a digital terminal for example) in order to allow the client to manage the transaction in total confidentiality (when inserting his card and entering his PIN code).

To this end, the terminal therefore needs to be very easily detachable so that its use is simplified.

According to a first technique illustrated in FIG. 1, the mobile payment terminal A is simply inserted into a dock/base B situated on the back of the digital support C, which is a touch-screen tablet as illustrated herein.

The terminal is held in its dock by means of clips D or D' that are fixed or mobile (for example a hook on a slider that can be shifted with the finger by a few millimeters so as to release the terminal) or any other similar element.

One drawback of this known technical solution lies in the fact that the payment terminal does not have any secured system to control or verify its removal from the dock. The terminal is thus easily removable from the dock by an unauthorized third party and is therefore highly subject to the risk of theft.

Another drawback of this known technical solution lies in the risk that terminal might fall. Indeed, since the terminal is fixed to a mobile digital support, the different movements of this support can lead to the undesired detachment of the terminal and therefore cause it to fall.

To overcome these drawbacks of the prior art, a second technique has been developed. This technique implements, in addition to the known dock, a system for locking the mobile payment terminal borne by the digital support.

Thus, when the terminal is inserted into the dock, the locking system prevents any unwanted removal from the terminal.

One drawback of this known second technical solution lies in the fact that the unlocking system can be activated by any individual whatsoever.

Another drawback of this known technical solution lies in the major cost of the system for locking the mobile payment terminal to the digital support.

In other words, there presently no secure and simple system for using a mobile payment terminal with a nomadic digital support.

4. SUMMARY OF THE INVENTION

The invention proposes a mobile electronic device comprising means of reversible fixed attachment to a support, the device comprising means to command the unlocking of the reversible fixed attachment means enabling the device to be detached from the support.

Thus, the invention relies on wholly novel and inventive approach to the locking of a mobile electronic device (for example a terminal such as an electronic payment terminal) to a support (for example a digital support) using command means proper to the mobile electronic device enabling the unlocking of the fixed attachment means situated on the mobile electronic device.

Such an implementation prevents theft, falls or untimely unlocking of the mobile electronic device because, contrary to the prior art, unlocking is possible only by a command from the mobile electronic device itself.

Indeed, in the prior art techniques, the means for unlocking of the mobile electronic device from the support are situated on the support itself (for example in the form of a button used to eject the device) and can therefore to be actuated by any person passing near the system.

According to one particular aspect of the invention, the command means take the form of an electromechanical actuator internal to the mobile electronic device and not accessible from the exterior of the electronic payment terminal.

The use of an electromechanical actuator enables mechanical action on the reversible fixed attachment means. At the same time, this actuator is electronically steerable.

Thus, the detachment of the mobile electronic device cannot be carried out by external action on the terminal. It can be done only by electronically steering/commanding the electromechanical actuator.

According to one particular characteristic of the invention, the mobile electronic device furthermore comprises control means capable of communicating with the command means borne by the mobile electronic device.

Thus, in this embodiment of the invention, such control means control the activation of the command means.

For example, the control means enable the activation of the command means by simple transmission of the amount corresponding to the transaction in progress, either explicitly or in a stream or flow of parameters including this amount corresponding to the transaction.

In particular, the control means are capable of generating and transmitting a piece of command information to the command means authorizing the unlocking of the mobile electronic device.

According to one particular aspect of the invention, the reversible attachment means are capable of cooperating automatically with locking elements borne by the support when the mobile electronic device is fixedly attached to the support.

The advantage of an automatic fixed attachment of the mobile electronic device to the support is that the command means do not have to be used once again in order to fixedly attach the mobile electronic device to the support. Such an embodiment simplifies the general use of the mobile electronic device and therefore gives rise to a gain in time and ergonomic comfort for the user.

For example, the reversible fixed attachment means borne by the mobile electronic device include at least one aperture made on at least one face of the device, the aperture being capable of co-operating with at least one movable lug formed by the locking elements borne by the support so as to lock the mobile electronic device to the support.

Thus, according to the embodiment, such means enable the mobile electronic device to be locked to the support and to be given optimal stability on the support. Indeed, the use of at least one aperture (circular or rectangular for example) intended for cooperation with at least one lug enables the mobile electronic device to be centered and held with precision.

For example, the command means take the movable lug between at least one deployed position in which the mobile electronic device is locked to the support and one retracted position in which the mobile electronic device can be withdrawn from the support.

This embodiment enables easy and speedy withdrawal while at the same time guaranteeing an ensured locking of the mobile electronic device.

According to another example, the reversible fixed attachment means borne by the mobile electronic device and the locking elements borne by the support are configured to form a system for the magnetic locking of the mobile electronic device to the support.

According to this embodiment, such a locking system makes it possible for the mobile electronic device to be used without any particular additional mechanical element, such as a dock on the support. In other words, the system makes the mobile electronic device adaptable to any type of support without requiring the use of a dock having a plurality of locking elements of the mobile electronic device. It can therefore be implemented very easily.

For example, the reversible attachment means borne by the mobile electronic device and the locking elements borne by the support are respectively a magnet and a coil.

Thus, according to this particular embodiment of the invention, the implementation of a magnet and a coil in order to fixedly attach and lock the mobile electronic device to the support enables simple and low-cost implementation of a magnetic system. Indeed, this implementation requires few modifications of the mobile electronic device and the support as compared with the prior art.

According to another embodiment, the reversible fixed attachment means borne by the mobile electronic device comprise a housing and a movable tab that are capable of cooperating with a static bolt formed by the locking elements borne by the support so as to lock the mobile electronic device to the support.

These means are simple to implement, reliable and robust. The maintenance of such means therefore costs little.

According to one particular aspect of the invention the command means are configured to enable the withdrawal of the mobile electronic device from the support when at least one pre-determined criterion relating to a defect or malfunction of the mobile electronic device is detected.

This aspect is used to withdraw the mobile electronic device from the support when the latter is in a defective state, for example when it is no longer being powered or when communication with the digital support is no longer working. In the case of a defect, the command means are automatically placed in an unlocking configuration for unlocking the reversible attachment means thus enabling the withdrawal of the mobile electronic device.

The invention also relates to a mobile electronic system comprising a support and a mobile electronic device as described above.

The invention also relates to a method for unlocking a mobile electronic device comprising a step for commanding the unlocking of the means for the reversible fixed attachment of the mobile electronic device enabling the mobile electronic device to be detached from a support.

5. LIST OF FIGURES

Other features and advantages of the invention shall appear more clearly from the following description given by way of a non-exhaustive and indicative example and from the appended drawings of which:

FIG. 1 illustrates a system for holding a mobile payment terminal to a digital support as already described with reference to the prior art;

FIGS. 2a and 2b present a view in perspective or three-quarter view of a first embodiment of the invention;

6. DETAILED DESCRIPTION

The principle of the invention relies on the controlled unlocking of a mobile electronic device (for example a mobile payment terminal) from a support (for example a digital support such as tablet or a smartphone or, again, a digital terminal). The unlocking is controlled on the mobile electronic device.

More specifically, the invention enables the withdrawal of a mobile electronic payment terminal from a digital support to be controlled.

6.1 Description of a First Embodiment of the Invention

Figure 1:
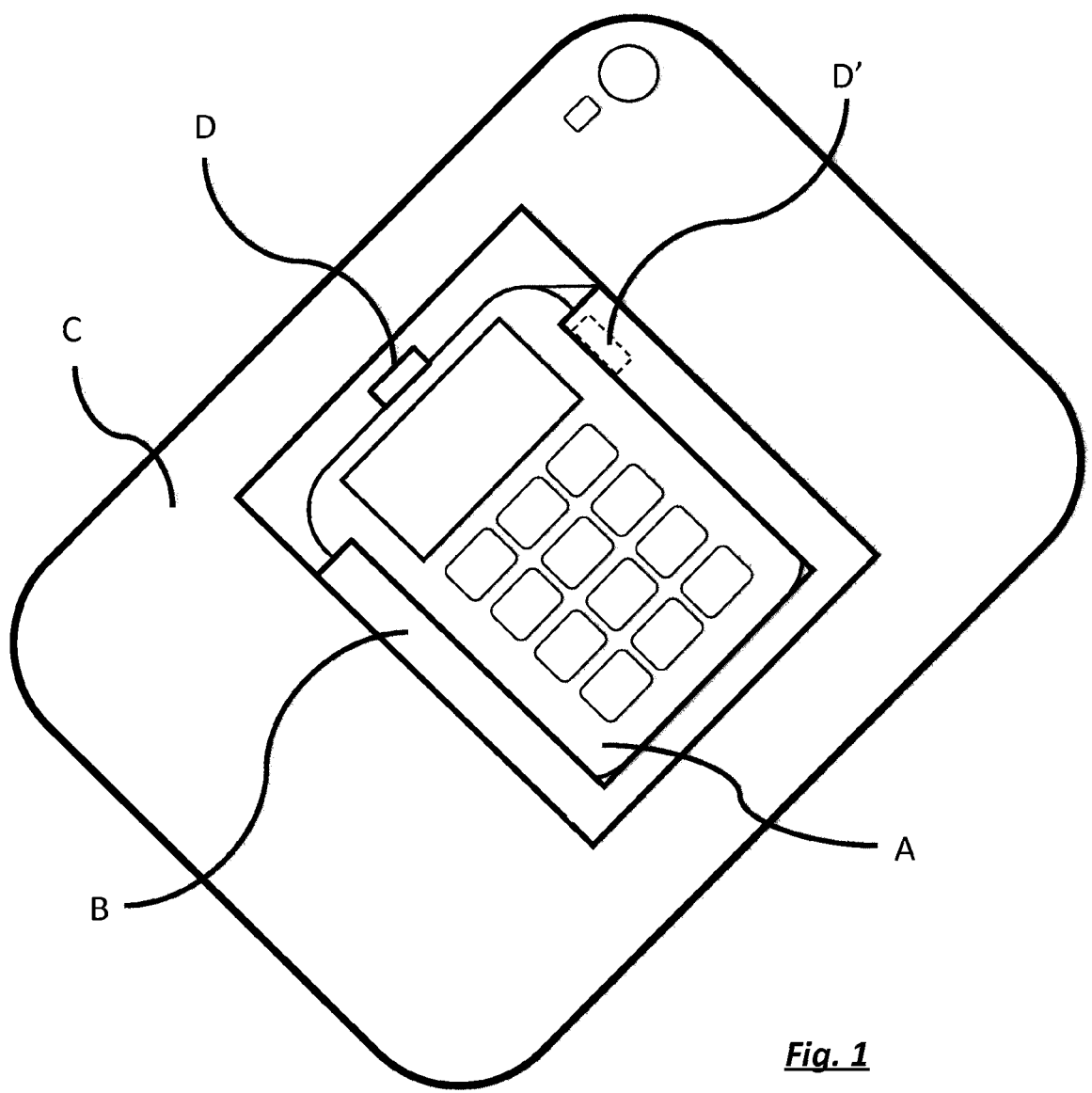
Figures 2A, 2B:
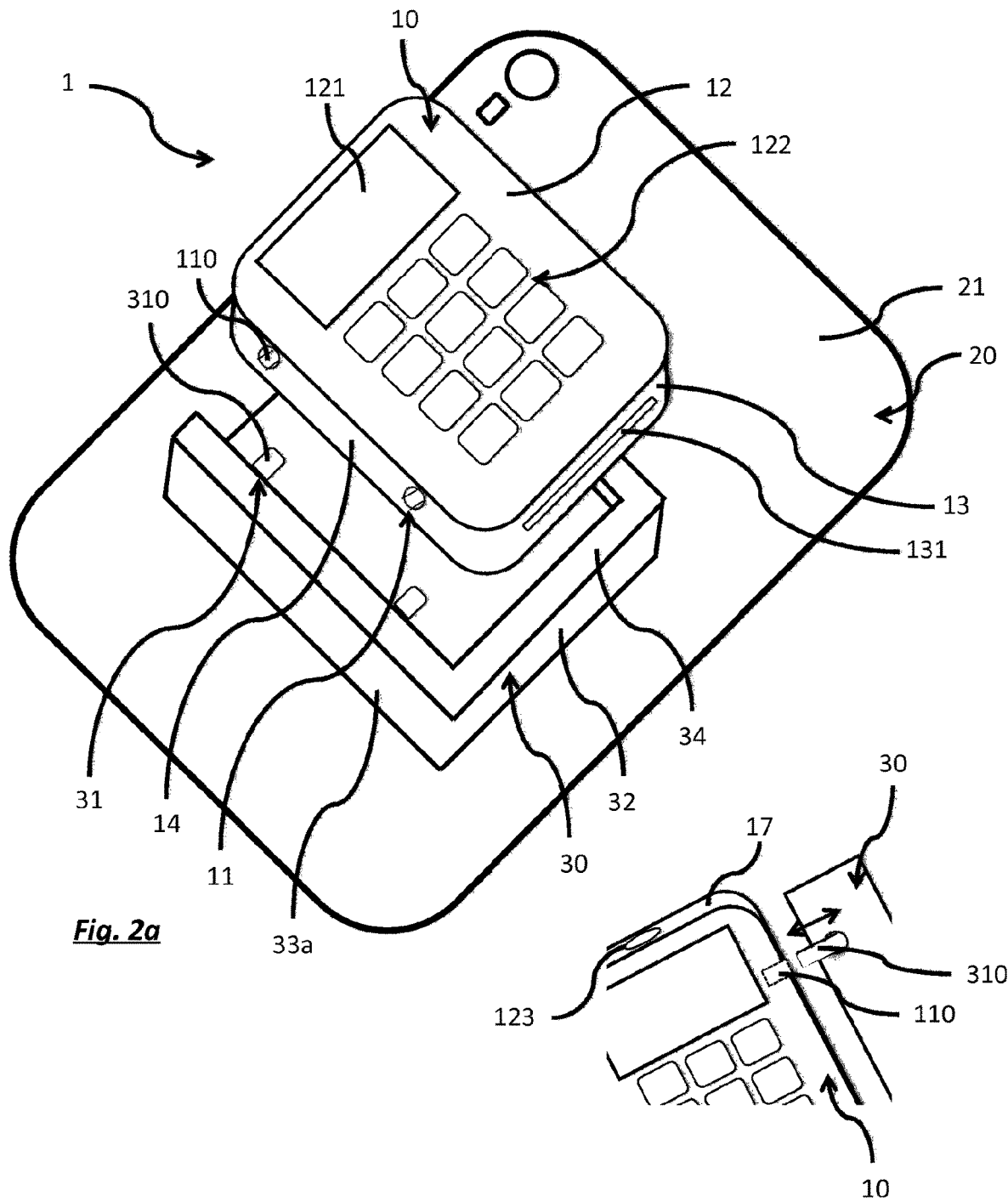

Referring now to FIGS. 2a and 2b, we present a mobile electronic system (or payment system for example) implementing a technique according to one particular embodiment of the invention.

Thus, the payment system 1 implements a digital support 20 or touch-screen tablet and a mobile electronic device or mobile payment terminal 10.

On its rear face 21, the support 10 has a dock or housing 30 capable of receiving the payment terminal 10.

The dock 30 has a substantially rectilinear longitudinal wall 30 having, at each of its extremities, two side walls 33a and 33b (not shown) of the same length and extending substantially perpendicularly to the wall 32.

The dock 30 therefore has a U shape and furthermore comprises a ledge 34 on all the walls 32, 33a and 33b that extends perpendicularly.

The layout of the walls 32, 33a, 33b and of the ledge 34 thus forms a housing capable of receiving the mobile payment terminal 10 while at the same time retaining it.

Besides, the dock 30 comprises locking elements 31 situated on each of the side walls 33a and 33b. The locking elements 31 take the form of lugs 310.

More specifically, each side wall 33a and 33b has two lugs 310. These lugs extend perpendicularly to the side walls and are oriented towards the interior of the dock 30. Thus, the lugs 310 of the wall 33a and those of the wall 33b are facing each other.

In addition, the lugs 310 are movable in translation between two positions:
- a retracted position (not shown) in which they are recessed inside the walls 33a and 33b. This position enables the insertion of terminal 10 into the dock 30 and its withdrawal from this dock 20;
- a deployed position, as illustrated in FIGS. 2a and 2b, in which they have come out of the walls 33a and 33b. This position enables a locking of the terminal 10 into the dock 30.

In one variant, it can be envisaged that only one lug 310 will be used on one of the side walls 33a, 33b while at the same time ensuring the efficiency of the locking of the terminal 10 to the support 20.

The mobile payment terminal 10 which has a substantially parallelepiped shape comprises, on its front face 12, a display screen 121 and a keypad 122 comprising a plurality of keys.

It will be understood of course here that the terminal 10 can have any shape other than that of a parallelepiped.

The mobile payment terminal 10 also comprises a rectilinear opening 131 made on the lower surface 13 and intended to receive a smart card (not shown), for example a payment card.

In addition, the mobile payment terminal 10 comprises reversible fixed attachment means 11. These reversible fixed attachment means form for example circular holes 110 made in the side surfaces 14 and 15 of the mobile payment terminal 10.

These holes 110 are configured so as to cooperate with the lugs 310 of the dock 30 when the lugs are in the deployed position. Thus, the locking elements 31 and the reversible fixed attachment means 11 enable reversible fixed attachment of the payment terminal 10 to the digital support 20.

The mobile payment terminal 10 also comprises command means 170 for commanding the unlocking of the terminal 10 from the support 20. These command means 170 (not shown) take the form of an electromechanical actuator to act on the reversible fixed attachment means.

In this embodiment, the electromechanical actuator (not shown) is internal to the mobile electronic payment 10 and enables the movable lugs 310 to be taken from the deployed position to the retracted position and vice versa. This electromechanical actuator is not accessible from the exterior of the electronic payment terminal and can be steered only electronically through the control means described below.

Besides, the system 1 comprises control means (not shown) configured in this embodiment to transmit a piece of command information to the means for commanding the unlocking. This command information comprises an unlocking order designed to activate the electromechanical actuator, thus making it possible to unlock the terminal 10 from the dock 30.

This command information can be contained in a stream of parameters/information elements travelling through a wire link (USB, serial, Ethernet, modem, etc.) or wireless link of the BT or Wi-Fi type for example.

In the event of a defect in the terminal, the command means are automatically placed in a configuration enabling the withdrawal of the terminal 10 from the support 20. The defect can be of any type related to the powering of the terminal 10, the absence of communications between the terminal 10 and the support 20, a defect in one of the functions of the terminal 10 or else again it may relate to an explicit request from a maintenance worker.

Figure 3A:
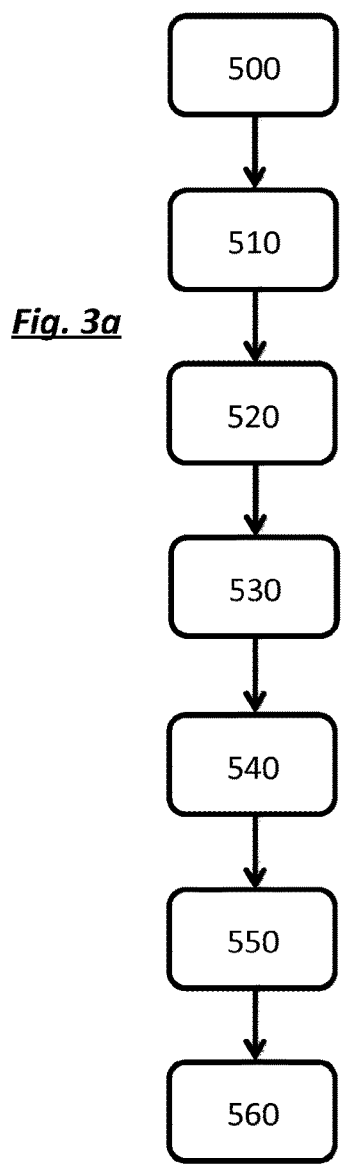
FIGS. 3a and 3b are event diagrams (or sequence diagrams) providing a generic view of the kinematics of the processing of a purchase respectively according to the first embodiment and according to a variant of the first embodiment.

A more detailed description of the working of these command and control means shall now be provided with reference to FIG. 3a in the context of a purchase by a consumer from a merchant or service provider equipped with such a system of payment 1. After having selected the product or service desired, the consumer uses the digital support 20 to confirm his shopping basket/his order (step 500).

The confirmation of the shopping basket then triggers the phase of payment for the consumer's order. To this end, it is necessary for the consumer to insert his payment card into the terminal 10 and for him to enter his confidential code (PIN code).

In order to facilitate the insertion of the card and the entry of the code, the terminal 10 must be withdrawn from the digital support 20. Thus, when the consumer or the merchant confirms the shopping basket, the terminal 10 receives the amount of the transaction (step 510) through the communication means existing between the support 20 and the terminal 10.

On receiving the amount of the transaction, the control means send a piece of command information comprising an unlocking order to the command means (step 520).

The reception of the unlocking order leads to the activation of the command means enabling the unlocking of the reversible fixed attachment means (step 530). During this step, the electromechanical actuator pushes back the movable lugs 310 into the side walls 33a and 33b of the dock 30 so that these lugs are in the recessed position.

This position then releases the terminal 10 which can be withdrawn (step 540) from the dock (by the merchant for example).

Once the terminal 10 is withdrawn from the dock 30, the consumer can easily proceed to make payment by inserting his payment card into the slot 130 of the terminal 10 and entering his PIN code by means of the keypad 122 (step 550).

The merchant then reinserts the terminal 10 into the dock 30 of the support 20 (step 560).

Figure 3B:
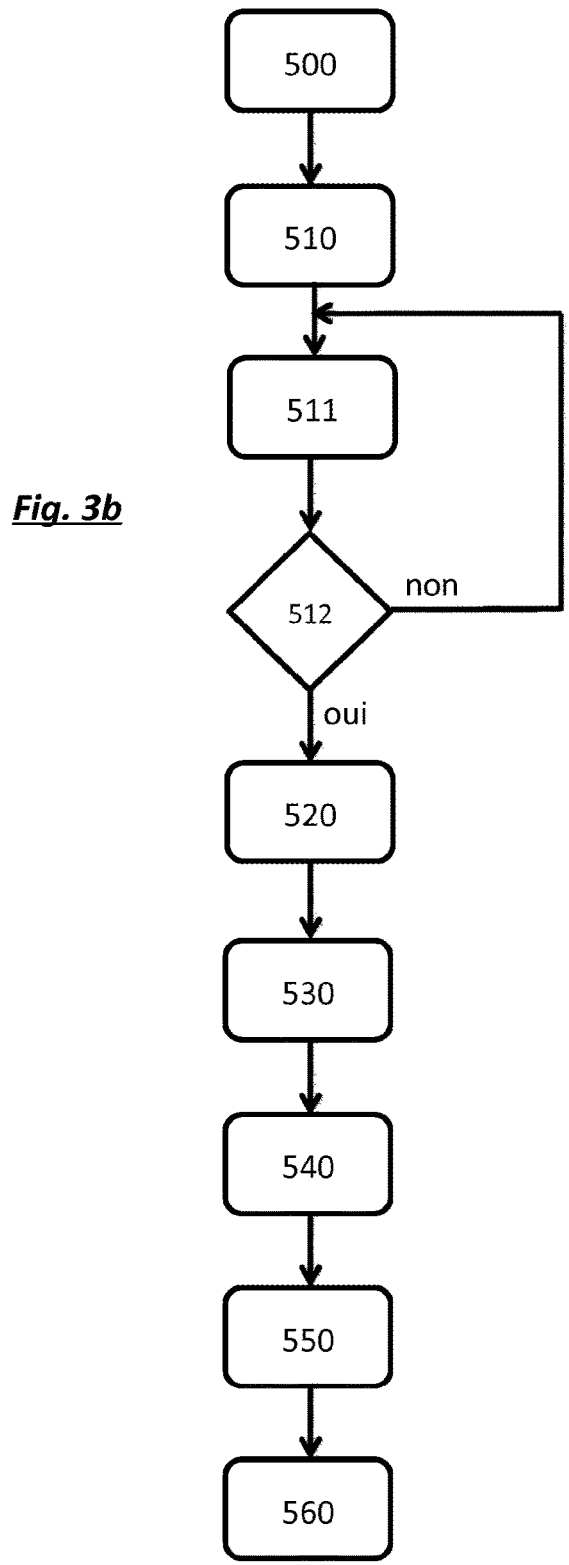

In one variant, related to FIG. 3b, following the transmission of the amount of the transaction (step 510), the command means make a request, through the terminal 10, for the entry of the unlocking code (step 511) by the merchant so as to authorize the withdrawal of the terminal 10.

Should the code entered by the merchant be wrong (test 512), no unlocking order whatsoever is sent from the control means to the command means, thus prompting a refusal to unlock the terminal 10.

Without this unlocking order, the means for commanding the unlocking are inhibited/inactive and therefore do not allow the detachment of the terminal 10.

The control means therefore, once again, request the entry of the code (step 51) by the merchant until a valid code enabling the unlocking of the terminal 10 is entered.

If the code entered by the merchant is valid (test 512), the control means transmit the unlocking order (step 520) to the means for commanding the unlocking.

The following steps are then identical to the steps described above.

In another alternative embodiment, the upper face 17 of the mobile payment terminal 10 comprises a manual command element 171 for commanding the unlocking of the terminal 10 of the support 20. This manual command element 171 takes for example the form of a push button which, when it is pressed/activated, triggers the passage of the lugs 310 from the deployed position to the retracted position, thus enabling the withdrawal of the terminal 10 from the dock 30.

This manual command element 171 is unblocked by the control means when it receives the unlocking order and can therefore be pressed/activated to enable the unlocking of the terminal 10. It is therefore always the control means internal to the electronic payment terminal that enable the steering/unlocking of the electronic payment terminal.

In another alternative embodiment, the control means are situated on the support and communicate with the command means 171 via the existing communication means between the support and the terminal 10. Thus, according to this variant, the merchant inhibits the command means by action on the digital support and not on the terminal, before handing over the system (the digital support plus the terminal) to the consumer who will enter his PIN code directly into the terminal linked to the tablet. According to this variant, the unlocking command means are steered of course by control means external to the electronic payment terminal but through existing communication means between the electronic payment terminal and the support and not by external action on the electronic payment terminal. In other words, the control means communicate with the command means in a secured way under the merchant's responsibility.

It must be noted that the control and command means can be implemented in different ways according to other embodiments of the invention so as to control the withdrawal of the terminal from its support in a secured and ergonomic manner.

In another variant of this first embodiment, the means respectively forming the reversible fixed attachment means 11 borne by the terminal 10 and the locking elements 11 situated on the dock 30 are inverted. In other words, the movable lugs 310 are situated on the side surfaces 14 and 15 of the terminal 10 and the corresponding holes 110 are made in the side walls 33*a* and 33*b* of the dock 30 in place of the lugs 310.

6.2 Description of a Second Embodiment of the Invention

Figure 4:
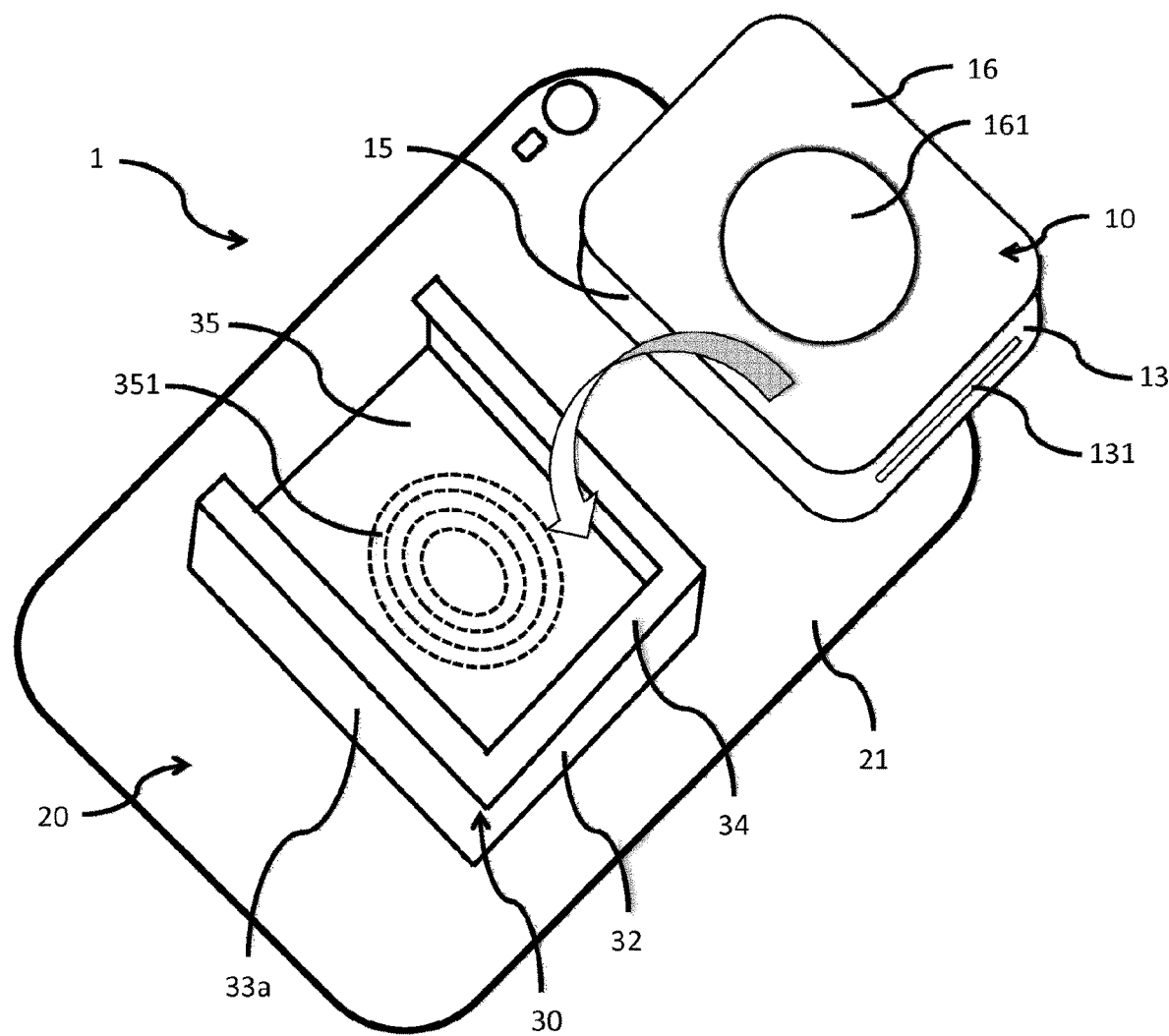
FIG. 4 is a view in perspective or three-quarter view of a second embodiment of the invention.

In a second embodiment of the invention, illustrated in FIG. 4, the reversible fixed attachment means for attaching the mobile payment terminal 10 to the digital support 20 take the form of a part of an electromagnetic system cooperating with another part situated on the dock of the digital support 20.

More specifically, on its bottom surface 35, the dock 20 has locking elements (for example a coil 351) capable of producing an electromagnetic field (not shown).

This coil 351 associated with a magnet 161 (formed by the reversible fixed attachment means 11) disposed on the rear face 16 of the terminal 10 thus magnetically locks the terminal 10 to the support 20.

In one variant, the coil 351 is borne by the terminal 10 and the magnet 161 by the dock 30 of the support 20.

It will be understood here of course that the coil 351 and the magnet 161 can be substituted or replaced by equivalent electromagnetic elements used to achieve the same effect.

The implementing of command and control means described above with reference to the first embodiment can be applied to this second embodiment of the invention and is not described in detail again.

6.3 Description of a Third Embodiment of the Invention

Figures 5A, 5B:
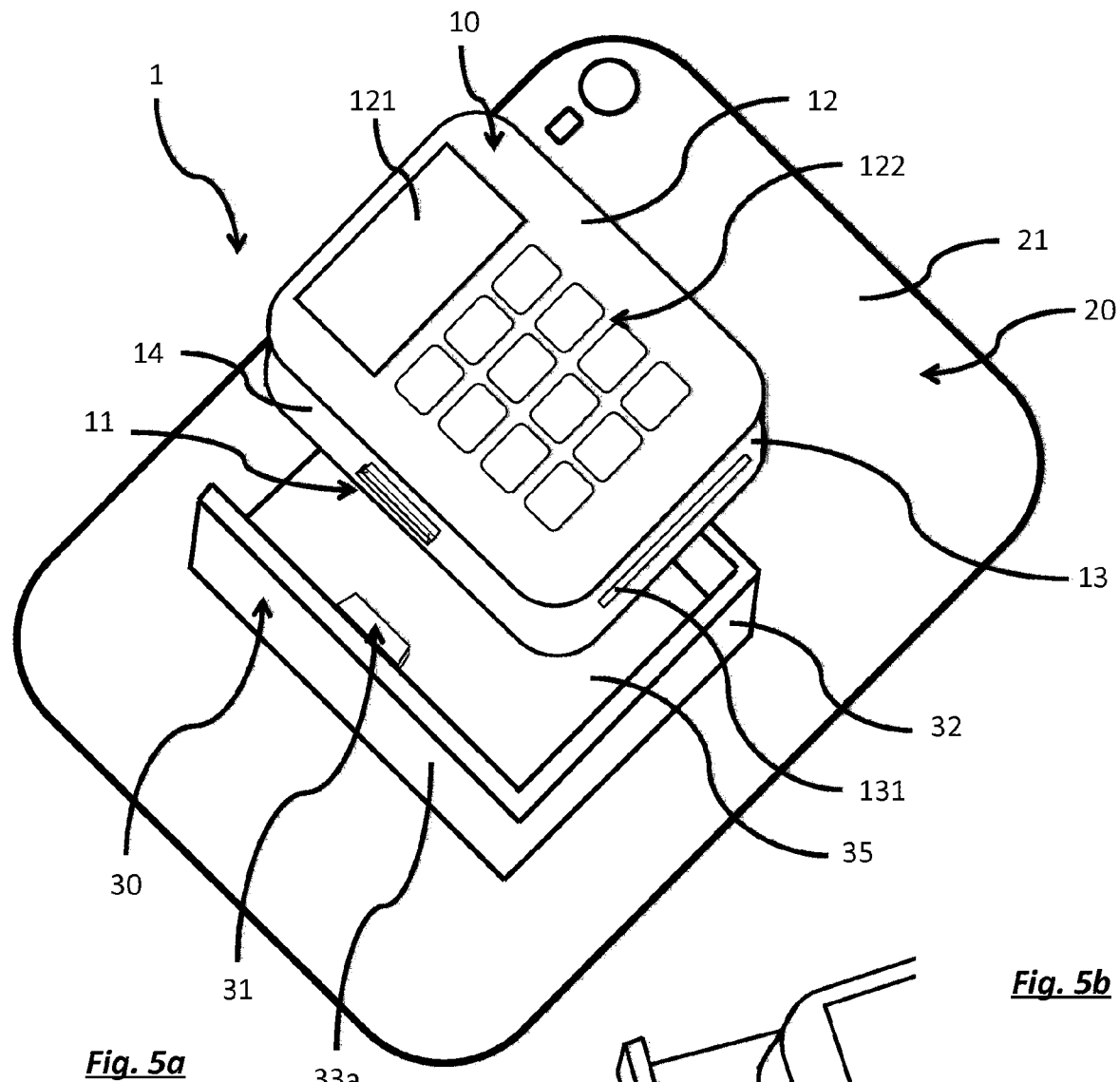
FIGS. 5a and 5b are views in perspective or three-quarter views of a third embodiment of the invention.

In a third embodiment of the invention, illustrated in FIGS. 5*a* and 5*b*, the reversible fixed attachment means of the mobile payment terminal 10 as well as the locking elements of the support 20 have been modified.

More specifically, the locking elements 31 (situated on the dock 30) take the form of a static/fixed bolt 312 situated on the wall 333 of the dock 30 and extending perpendicularly from this wall towards the interior of the dock 30.

In addition, the reversible fixed attachment means 11 take the form of a striker plate situated on the side surface 14 of the terminal 10 and having a movable tab 112*a* and a housing 112*b*.

This housing 112*b*, having a shape corresponding to the bolt 312, is made on the surface 14 of the mobile payment terminal 10 and is configured to receive the bolt 312 during the locking.

The bolt 312 accesses the housing 112*b* through a rotational movement of the movable tab 112*a*. Once the bolt 312 is inserted into the housing 112*b*, the movable tab 112*a* resumes its initial position and thus blocks the bolt 312 in the housing 112*b*.

In one variant of this embodiment, the respective means of fixed attachment on the electronic payment terminal and on the support can be inverted. Thus, the striking plate could be situated on the wall 33*a* of the dock 30 while the bolt 312 could be situated on the side surface 14 of the terminal 10.

Here too, the implementing of the command and control means described above with reference to the first embodiment can be applied to this second embodiment of the invention, and is not described in detail again.

An exemplary embodiment of the present application overcomes the different drawbacks of the prior art.

More specifically, at least one embodiment provides these secured techniques for unlocking a mobile payment terminal to a nomadic digital support.

In other words, at least one embodiment seeks to prevent theft, falls and hasty removal of the mobile payment terminal.

At least one embodiment is also aimed at providing a technique of this kind that is reliable and simple to use while costing little.

At least one embodiment provides a technique of this kind that is robust and requires little maintenance.

Although the present disclosure has been described with reference to one or more examples, workers skilled in the art will recognize that changes may be made in form and detail without departing from the scope of the disclosure and/or the appended claims.

The invention claimed is:

1. A mobile electronic payment terminal comprising:
a plurality of adjoining surfaces, including at least a front surface, a rear surface and side surfaces, that together define an interior of the mobile electronic payment terminal;
a display screen on one of the plurality of adjoined surfaces;
a plurality of keys on one of the plurality of adjoined surfaces;
a card opening on one of the plurality of adjoining surfaces to receive a smart card;
a reversible fixed attachment on at least one of the plurality of adjoining surfaces, which cooperates with at least one locking element borne by a support; and
a command module, which commands unlocking of the reversible fixed attachment, said command module shifting said reversible fixed attachment between locking and unlocking positions so as to detach said mobile electronic payment terminal from said support, said command module comprising an electromechanical actuator positioned in the interior of said mobile electronic payment terminal and inaccessible from an exterior of said mobile electronic payment terminal.

2. The mobile electronic payment terminal according to claim 1, wherein said reversible fixed attachment cooperates automatically with the at least one locking element borne by said support when said mobile electronic payment terminal is fixedly attached to said support.

3. The mobile electronic payment terminal according to claim 2, wherein said reversible fixed attachment and said at least one locking element borne by said support are configured to form a system for magnetic locking of said mobile electronic payment terminal to said support.

4. The mobile electronic payment terminal according to claim 2, wherein said reversible fixed attachment comprises a housing and a movable strip cooperating with a static bolt formed by said at least one locking element borne by said support so as to lock said mobile electronic payment terminal to said support.

5. The mobile electronic payment terminal according to claim 1, wherein the reversible fixed attachment includes at least one aperture made on at least one of the plurality of adjoining surfaces of said mobile electronic payment terminal, said at least one aperture cooperating with at least one movable lug formed by said at least one locking element borne by said support so as to lock said mobile electronic payment terminal to said support.

6. The mobile electronic payment terminal according to claim 5, wherein said command module drives said at least one movable lug between at least one deployed position in which said mobile electronic payment terminal is locked to said support and one retracted position in which said mobile electronic payment terminal can be withdrawn from said support.

7. The mobile electronic payment terminal according to claim 1, wherein the said command module is configured to enable withdrawal of said electronic payment terminal from said support when at least one pre-determined criterion relating to a defect in the mobile electronic payment terminal is detected.

8. A mobile electronic system, which comprises:
a support comprising at least one locking element; and
a mobile electronic payment terminal comprising:
a plurality of adjoined surfaces, including at least a front surface, a rear surface and side surfaces, that together define an interior of the mobile electronic payment terminal;
a display screen on one of the plurality of adjoined surfaces;
a plurality of keys on one of the plurality of adjoined surfaces;
a card opening on one of the plurality of adjoining surfaces to receive a smart card;
a reversible fixed attachment on at least one of the plurality of adjoining surfaces, which cooperates with the at least one locking element of the support; and
a command module, which commands unlocking of the reversible fixed attachment, said command module shifting said reversible fixed attachment between locking and unlocking positions so as to detach said mobile electronic payment terminal from said support, said command module comprising an electromechanical actuator positioned in the interior of said mobile electronic payment terminal and inaccessible from an exterior of said mobile electronic payment terminal.

9. A method for unlocking a mobile electronic payment terminal, implemented by said mobile electronic payment terminal and comprising:
attaching the mobile electronic payment terminal to a support with a reversible fixed attachment, the mobile electronic payment terminal comprising:
a plurality of adjoined surfaces, including at least a front surface, a rear surface and side surfaces, that together define an interior of the mobile electronic payment terminal;
a display screen on one of the plurality of adjoined surfaces;
a plurality of keys on one of the plurality of adjoined surfaces;
a card opening on one of the plurality of adjoining surfaces to receive a smart card;
a reversible fixed attachment on at least one of the plurality of adjoining surfaces, which cooperates with at least one locking element borne by the support; and
operating a command module by the mobile electronic payment terminal, the command module comprising an electromechanical actuator internal to said mobile electronic payment terminal to command unlocking of the reversible fixed attachment of said mobile electronic payment terminal, enabling said mobile electronic payment terminal to be detached from the support, said command module shifting said reversible fixed attachment between locking and unlocking positions so as to detach said mobile electronic payment terminal from said support, wherein electromechanical actuator is positioned in the interior of said mobile electronic payment terminal and is inaccessible from an exterior of said mobile electronic payment terminal.

\* \* \* \* \*